US006590966B2

(12) United States Patent
Tittle

(10) Patent No.: US 6,590,966 B2
(45) Date of Patent: Jul. 8, 2003

(54) INTERACTIVE VOTING METHOD

(76) Inventor: Patrick J. Tittle, 445 E. Minnehaha Ave., St. Paul, MN (US) 55101

( * ) Notice: Subject to any disclaimer, the term of this patent is extended or adjusted under 35 U.S.C. 154(b) by 246 days.

(21) Appl. No.: 09/821,583

(22) Filed: Mar. 29, 2001

(65) Prior Publication Data

US 2002/0141551 A1 Oct. 3, 2002

(51) Int. Cl.[7] .............................................. H04M 11/00

(52) U.S. Cl. ............................... 379/92.02; 379/88.25; 705/12

(58) Field of Search .......................... 379/92.02–92.04, 379/93.02, 93.03, 88.02, 88.25, 93.26; 705/12; 704/275

(56) References Cited

U.S. PATENT DOCUMENTS 3,525,811 A * 8/1970 Trice et al. ............. 379/92.02
5,056,086 A * 10/1991 Libonati ................. 379/88.25
5,612,871 A * 3/1997 Skogmo ...................... 705/12
6,401,066 B1 * 6/2002 McIntosh .................... 704/275

* cited by examiner

*Primary Examiner*—Wing Chan
(74) *Attorney, Agent, or Firm*—Jacobson and Johnson

(57) ABSTRACT

An interactive method of voting wherein the voter is issued a voter-specific identification code which allows the voter to call an interactive telephone system which asks the voter questions and then checks a database to confirm the correctness of the answers. If the answers are correct the person calling is confirmed as the person identified in the voter-specific-identification code. The interactive telephone system polls the voter and records the voter preference on issues or candidates. Once the vote is completed the link between the voter identification information and the vote is severed thereby ensuring the secrecy of the ballot while still maintaining a record of who has voted.

17 Claims, 1 Drawing Sheet

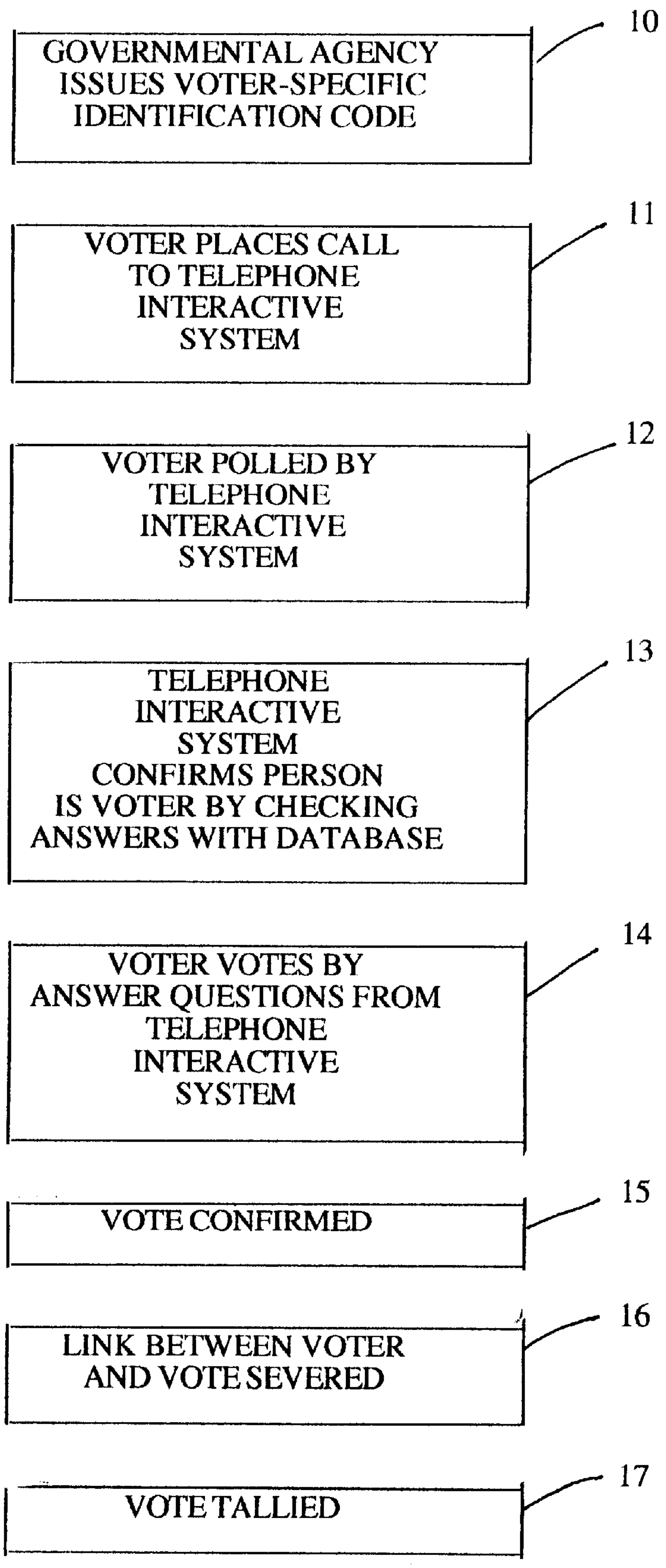
GOVERNMENTAL AGENCY ISSUES VOTER-SPECIFIC IDENTIFICATION CODE
10
VOTER PLACES CALL TO TELEPHONE INTERACTIVE SYSTEM
11
VOTER POLLED BY TELEPHONE INTERACTIVE SYSTEM
12
TELEPHONE INTERACTIVE SYSTEM CONFIRMS PERSON IS VOTER BY CHECKING ANSWERS WITH DATABASE
13
VOTER VOTES BY ANSWER QUESTIONS FROM TELEPHONE INTERACTIVE SYSTEM
14
VOTE CONFIRMED
15
LINK BETWEEN VOTER AND VOTE SEVERED
16
VOTE TALLIED
17

INTERACTIVE VOTING METHOD

FIELD OF THE INVENTION

This invention relates generally to a method of voting and more specifically to a method of voting using an interactive telephone system.

BACKGROUND OF THE INVENTION

The right to vote as well as the secrecy of the ballot is of fundamental importance to a U.S. citizen and is guaranteed to every citizen by the Constitution of the United States. One of the difficulties in current voting methods is that various regions of the country do not have uniform voting standards nor do all regions have up-to-date voting equipment. These conditions have been found to cause problems in tallying votes as well as identifying those people that are eligible to vote. The present invention comprises a method of voting that uses a single central system that connects to existing home communications equipment and is available to practically everyone. At the same time the method provides a uniform evaluation standard for identification of an eligible voter as well as a uniform standard for tallying a vote for a particular candidate or a vote on a particular issue.

SUMMARY OF THE INVENTION

Briefly, the invention comprises an interactive method of voting wherein the voter is issued a voter-specific identification code which allows the voter to use his or her own telephone to call an interactive telephone system which asks the voter questions. The system checks the caller's responses against a database to confirm that the person calling corresponds to the person identified by the voter-specific identification code. If the person calling is confirmed as the person identified in the voter-specific identification code, the interactive telephone system polls the voter and records the voter preference on issues or candidates.

Once the vote is completed the link between the voter identification information and the vote cast is severed thereby ensuring the secrecy of the ballot while still maintaining a record of who has voted.

BRIEF DESCRIPTION OF THE DRAWINGS

The drawing shows a flow chart illustrating the steps involved in the method of voting.

DESCRIPTION OF THE PREFERRED EMBODIMENT

The present invention comprises a method of interactive voting comprising three main steps. In the first step, the voter eligibility is determined, in the second step, the voter exercises the vote and, in the third step, the vote is tallied as the link between the voter identification material and the vote is severed.

In order to initiate the method of the present invention a governmental agency such as the Secretary of State issues a voter-specific identification code. This step is illustrated by reference numeral 10. For example, the voter-specific identification code could be a multiple digit personal identification number or some other unique information that is issued to only one specific voter. The first step can be initiated by the voter by either telephoning the governmental agency or presenting himself or herself in person to the governmental agency in order to obtain the voter-specific identification code.

Once the voter receives the voter-specific identification code the voter places a telephone call to an interactive telephone system operated by the governmental unit. This step is illustrated by reference numeral 11. The voter enters the voter-specific identification code in response to voice instructions from the interactive telephone system. Next, the voter provides answers to identification questions posed by the interactive telephone system. This step is illustrated by reference numeral 12.

The interactive telephone system is preferably a computer having voice recognition software and a voice generation software which is preprogrammed to pose oral questions to the voter over the telephone. For example, the questions posed by the interactive telephone system could be to ask the caller to provide his or her drivers licensee number, the home address, the date of birth etc. This information could be entered orally or by having the voter punch selected keys on the telephone keypad. In addition, the caller telephone number could be checked to help confirm that the telephone call is being placed from the telephone of the person listed in the voter-specific identification code although such information would not be conclusive as to identification but merely corroborating evidence of proper identification. If the voter orally responded to the questions posed by the interactive telephone system, the interactive telephone system would covert the voice information to electrical signals for comparison with a database to determine if the voter supplied information is correct.

Once the voter provides the answers by either keying in the response or orally responding to the questions the interactive telephone system checks the caller's answers for correctness with a database in order to confirm that the caller using the voter-specific identification code is the actual person calling. The existing database could be a drivers licensee database, a registered voters database or some other database that presents unique confirmation data to confirm the identify of the caller. This step is illustrated by reference numeral 13.

At this point the interactive telephone system can prevent fraud by checking a felon database to determine if the person calling is ineligible to vote because of a felony conviction. Thus the method includes the step of eliminating an ineligible voter from voting by checking against a felon database.

If the interactive telephone system confirms that the voter is eligible to vote the voter is presented with a further question regarding a voting preference for a candidate or a voting preference on an issue. For example, the voter can be given the option to enter the response on the telephone key pad by punching either of the letters y, p or n or the user could say yes, no or pass if the voter does not want to vote for a particular candidate or issue. This step is illustrated by reference numeral 14.

Thus the voter in the convenience and privacy of his or her home can vote for the candidate or the issue by keying in or orally answering the further questions which are orally posed to the caller by the interactive telephone system.

Once the caller provides the voter preference the interactive telephone system asks the voter to confirm the vote. At this point, the voter confirms the votes (This step is illustrated by reference numeral 15) and the interactive telephone system can electronically submit the vote to a tally system.

Once the vote is confirmed the link between the voter identification information is severed from the voters selected preferences. This step is illustrated by reference numeral 16. The voter information is stored in a voter database and the voter preference is stored in vote database. As any links between the voter database and the voter preferences are severed it ensures that the secrecy of the vote is maintained. At the same time a record of the person voting is stored in the voter database which can be used to prevent a person from voting again.

The vote is transmitted to a tally system, which is illustrated by reference numeral 17, where the vote is tallied and maintained for readout.

It will be apparent that with the present system the problem of different standards for one part of the state then another part of the state can be eliminated by using a single interactive telephone system for the entire state. As each voter can access the system from his or her home the difficulties of standing in line to vote as well as the inline checking voter eligibility is eliminated. In addition, the local counties and precincts of the states do not need to have any costly equipment since the voters can use there own telephones to vote.

I claim:

1. A vote by telephone method comprising the steps of:

issuance of a voter-specific identification code to a voter;

the voter places a telephone call to an interactive telephone system and enters the voter-specific identification code;

the interactive telephone system poses an identification question to the voter;

the voter orally provides an answer to the identification question posed by the interactive telephone system;

the interactive telephone system checks the answer with a government database to provide verification that the voter using the voter-specific identification code is the person calling;

the interactive telephone system checks a felon database to determine if the voter is eligible to vote;

if verified, the voter is presented with a further question regarding voting preferences for a candidates or an issue;

the voter places a vote for the candidate or the issue by answering the further question;

the interactive telephone system asks the voter to confirm the vote;

the voter confirms the vote; and the interactive telephone system submits the vote to a tally system.

2. The method of claim 1 wherein the step of issuance of the voter-specific identification code for the voter comprises the voter telephoning a governmental agency to request the voter-specific identification code.

3. The method of claim 2 wherein the voter-specific identification code issued by the governmental agency is a multiple digit personal identification number.

4. The method of claim 1 wherein if the interactive telephone system fails to verify that the voter is entitled to vote the telephone call is terminated by the interactive telephone system.

5. The method of claim 1 wherein the interactive telephone system electronically communicates with an existing governmental agency database to verify the correctness of the answer to the identification question.

6. The method of claim 1 wherein the step wherein the voter is presented with a further question regarding preference for the candidates or the issue comprises presenting an oral question to the voter.

7. The method of claim 1 wherein the step where the voter places a vote comprises punching a telephone keypad in response to the further question posed by the interactive telephone system.

8. The method of claim 1 wherein the step where the interactive telephone system asks the voter to confirm the vote comprises presenting an oral voting question to the voter.

9. The method of claim 1 wherein the interactive telephone system electronically submits the vote to a vote tally machine.

10. The method of claim 1 wherein the answer to the identification question is stored in a voter database.

11. The method of claim 10 wherein the step whether the voter confirms the vote, the vote is separated from the answer to the voter identification question before the answer to the voter identification question is stored in the voter database.

12. A vote by telephone method comprising the steps of:

issuance of a voter-specific identification code to a voter;

the voter places a telephone call to an interactive telephone system and enters the voter-specific identification code;

the interactive telephone system poses an identification question to the voter;

the voter provides an answer to an identification question posed by the interactive telephone system;

the interactive telephone system checks the answer with a database to provide verification that the voter using the voter-specific identification code is the person calling the interactive telephone system checks a felon database to determine if the voter is eligible to vote;

if verified, the voter is presented with a further question regarding voting preferences for a candidates or an issue;

the voter places a vote for the candidate or the issue by answering the further question;

the interactive telephone system asks the voter to orally confirm the vote;

the voter orally confirming the vote to the interactive telephone system; and the interactive telephone system submits the vote to a tally system.

13. A method of voting by using a telephone comprising the steps of:

generating a voter identification code;

calling a governmental interactive telephone system;

responding to an oral question posed by the governmental interactive telephone system by verbally generating a response to the oral question;

comparing the response to a database on voter information to determine if a caller is the person associated with the voter identification code; checking a felon database to determine if the voter is eligible to vote; and terminating the call if the caller response is not verifiable with the database on voter information and continuing the call if the caller response is verified with the database on voter information; and generating a vote for a candidate or an issue by having the caller respond to a further question posed by the interactive telephone system.

14. The method of claim 13 including the step of severing a link between the response to the voter identification question and the vote for a candidate or an issue prior to a tallying of the vote.

15. The method of claim 14 wherein the interactive telephone system receives calls from across a state and determines the vote from each of the calls based on a single vote standard for the entire state.

16. The method of claim 14 wherein the interactive telephone system receives calls from across a state and the step of comparing the response to a database of voter information comprises comparing to a public database of voter information.

17. The method of claim 16 wherein the interactive telephone system receives calls from across a state and determines the vote based on a single standard for the entire state.

* * * * *